(No Model.)
C. MUEHLEISEN.
GEARING.
No. 542,094. Patented July 2, 1895.
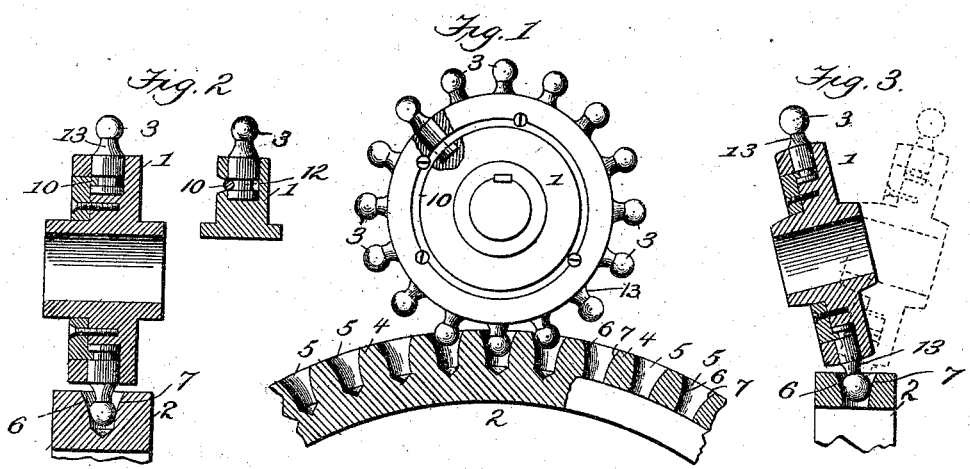
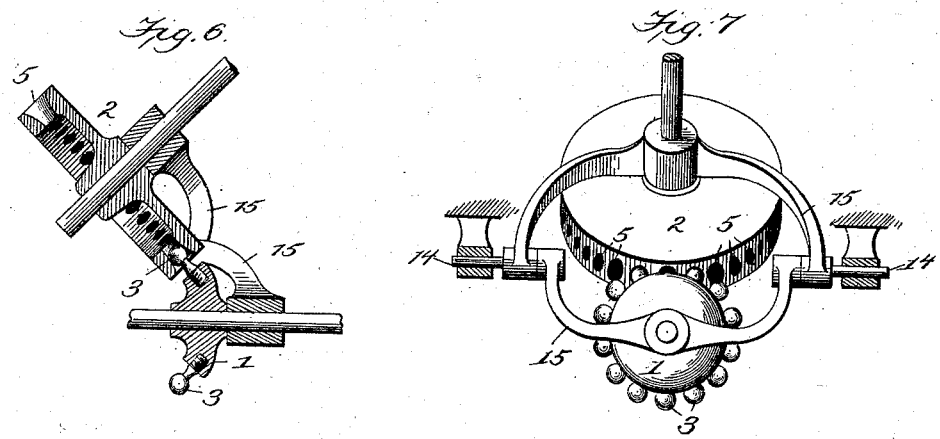
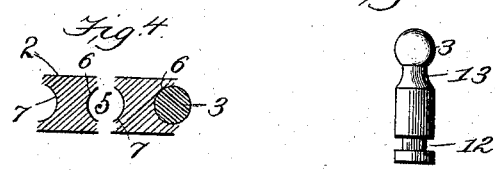
WITNESSES:
Edwin L. Bradford
Theo. L. Gatchel
INVENTOR
Carl Muehleisen
BY Johnson & Johnson
ATTORNEYS.

UNITED STATES PATENT OFFICE.

CARL MUEHLEISEN, OF BALTIMORE, MARYLAND.

GEARING.

SPECIFICATION forming part of Letters Patent No. 542,094, dated July 2, 1895.

Application filed March 29, 1894. Serial No. 505,542. (No model.)

*To all whom it may concern:*

Be it known that I, CARL MUEHLEISEN, a subject of the Emperor of Germany, (having declared in due form of law my intention of becoming a citizen of the United States,) residing at the city of Baltimore, in the State of Maryland, have invented certain new and useful Improvements in Gearing, of which the following is a specification.

My invention is directed to an improved gearing for transmitting the power of one wheel to another, and the particular matters of my improvement will be pointed out in the claims concluding this specification.

The object of my improvement is to allow the engagement of one of the wheels at an inclination on either side of a line perpendicular to the working face of the other and to allow one wheel to run correct with another wheel of any diameter, with the advantage of working at different angles, and with equal bearing-surface in all positions of the wheels. This advantage is obtained by constructing one of the wheels with teeth having ball or rounded ends and a neck or undercut part extending to the working face of the wheel, the other wheel having holes of round cross-section, their walls joining the circumference in a flaring mouth, which gives a convex form to said walls to co-operate with the neck part of the teeth in permitting the engagement of the toothed wheel at an inclination on either side of a line perpendicular to the working face of the other wheel.

My improvement provides for adjusting the teeth to change the wear-surfaces of their acting ends in relation to the walls of the co-acting holes, the toothed wheel for this purpose being provided with holes having straight walls to receive the teeth and with means for engaging the latter in such manner that the teeth may be turned upon such engaging means within the holes which contain them to change their wear-surface. Provision is also made for supporting a pair of wheels having teeth with undercut neck parts and holes with flaring ends and arranging the bearings of both the wheels in the same fixed hangers, whereby the wheels may be set at different angles without changing the correct working of the gear.

In the accompanying drawings I have shown gear-wheels embodying my invention, in which—

Figure 1 shows so much of a pair of engaging gear as illustrates my invention in the construction and operation of the engaging teeth. Figs. 2 and 3 show the same in transverse section. Fig. 4 is a horizontal section through the teeth of both wheels, showing the ball-tooth 3 in its action upon the convex walls 6 and 7 of the female tooth; and Fig. 5 shows the ball-tooth. Figs. 6 and 7 show pairs of wheels working together with ball form and female teeth like bevel-gear.

The teeth of one of the wheels project radially from its surface and this I call the "male" wheel 1, while the teeth of the other wheel do not project from its surface and this I call the "female" wheel 2, the teeth being formed between and by the solid parts and the walls made convex by flaring. The teeth 3 of the male wheel are of round form in cross-section—that is, their acting ends, are of ball form, so to give a contact line of convex shape, giving a large surface, acting with the function of a convex wall upon the circular convex walls of a hole. The teeth of the female wheel are formed by radial holes 5, made in its active surface, the opposite sides of each hole forming the working walls 6 and 7, as shown in Fig. 4, which are convex, as seen in Figs. 1, 2, and 3, and with which the convex walls of the male teeth engage. The solid parts 4 between the holes form walls of tooth shape, as seen in Fig. 1, so that the holes are adapted to take up the convex tooth of the other wheel whichever way the wheels rotate. These female teeth may be formed by drilling, milling, or casting and the holes may extend through or only partly through the rim of the wheel, but their convex walls must freely inclose the convex male teeth. The male teeth may be cast with the wheel or made separate and fastened in radial holes or sockets by any suitable means. I prefer the fastening-key, which by means of a lip 10 engages an annular groove 12 on the inner end of the tooth, so that these teeth can be readily removed and replaced when worn out or broken. Just back of its acting end the tooth has a reduced neck or undercut part 13 to allow the wheel to be set to work at an inclination to the engaging female wheel and on either side of the latter, as shown in Fig. 3.

In Figs. 6 and 7 I have shown a pair of wheels having male and female teeth and mounted so as to allow an inclination of one or both to each other and in which the bearings of one or both is mounted in a pivoted support 15, so that any change in such inclination, will preserve the proper working engagement of the teeth.

Referring to Figs. 6 and 7, it is important to notice that the bearings of the pivoted supports of both wheels are coincident with the contact line of the teeth, thereby allowing an inclination of one or both of the wheels without impairing the working relation of the teeth, and the said supports are mounted in fixed hangers, as in Fig. 7.

Referring to Figs. 4 and 5, it will be seen that the male teeth have a circular sectional area at their working ends, which may be of greater or less circular area than the body and that the latter may flare from the working ends to the surface of the wheel, so as to form a reduced neck, as at 13, between the working end of the tooth and the face of the wheel. The female tooth formed by the holes in the acting surface of the wheel makes each tooth with opposite working walls 6 and 7, which flare at their outer ends and form convex walls to coact with the convex walls of the male teeth, so that at the surface these holes are of greatest area, and the sides of each tooth have equal curves of convex form. It is also important to notice that fastening of the teeth by the key and groove gives the advantage of allowing the teeth to be turned in their radial holes or sockets to present new wear-surfaces when worn. This capacity for adjustment is provided by making the teeth with cylindrical shanks having annular grooves 12, into which the lip of a key of pin engages to lock the teeth in place and permit them to be turned, if found necessary, to compensate for wear. With this construction teeth terminating in ball-shaped working ends and having a reduced or neck part flaring from the ball to the surface of the wheel will be found useful in working with wheels having other than female teeth; but this capacity for turning the teeth to take up wear is of special advantage when used with the convex walls of the female teeth.

Referring to Fig. 4, the female teeth 5 are shown in cross-section, and the walls 6 and 7, being of circular form, have the appearance of being concave; but referring to Fig. 1 the flaring of the holes to the working face of the wheel gives the walls a convex form on all sides at the mouth and at the bottom of the hole, and it is this form of circular convex walls of male and female working gear-teeth which gives the perfect action of the gear in whatever angle they may be engaged.

I claim as my improvement—

1. A gearing composed of two wheels, one of which has teeth having rounded working ends and a neck or undercut part extending from the round of the end to the face of the wheel, the other wheel having holes of round cross section, each hole at one end being flared outward to the face of the wheel, whereby to allow one wheel to run correct with the other wheel of any diameter, at any desired angle to each other and with equal bearing surface of the teeth in all positions of the wheels.

2. A gearing composed of two wheels, one of which has teeth having rounded working ends and a neck or undercut part extending from the round of the end to the face of the wheel, the other wheel having holes of round cross section their walls flaring to the face of the wheel, in combination with a separate bearing for each shaft journaled in line with the contact elements and fixed supports for said journals, whereby both wheels are mounted in the same fixed supports, and either or both may be adjusted at different inclinations to each other, substantially as described.

3. A pair of gear wheels each formed with radial holes of round cross section, the holes of one wheel being filled with teeth formed with rounded shanks and rounded working ends adapted to engage holes in the other wheel which flare outward to the working face, in combination with means for engaging the round shanks of the teeth, whereby the latter may be turned on such engaging means to change the wear surface of their acting ends in relation to the walls of the holes of the co-acting wheel.

4. A gearing composed of two wheels, one having male teeth with ball shaped working ends, the other having radial holes forming female teeth having flaring open ends forming convex working walls within said holes for the purpose described.

5. A gear-wheel provided with radial teeth formed with ball-shaped working ends, a cylindrical shank and a reduced or neck part joining the cylindrical-shank and the ball end, the said shank being the fastening part for the tooth in the wheel and the said neck part being a part of the acting end of the tooth.

6. A gear-wheel formed with cylindrical holes and teeth removably secured therein by corresponding shanks having an annular groove and a ring for engaging said groove, whereby the teeth can be turned to present new engaging or wear surfaces.

7. A gear wheel formed with cylindrical holes in its acting face and an annular groove in its side intersecting said holes and having teeth of round cross section formed with annular grooves on their inner ends and a ring engaging the annular groove in the side of the wheel and the annular groove in the ends of the teeth.

In testimony whereof I have hereunto signed this specification in the presence of 2 witnesses.

CARL MUEHLEISEN.

Witnesses:
GEORGE S. BOOKER,
C. G. WESCOTT.